United States Patent [19]
Bolles

[11] Patent Number: 5,314,323
[45] Date of Patent: May 24, 1994

[54] STRIPPER PLATE LOCKING DEVICE

[75] Inventor: Gene Bolles, South Windsor, Conn.

[73] Assignee: Precision Plastic Tool Co., Inc., South Windsor, Conn.

[21] Appl. No.: 944,892

[22] Filed: Sep. 9, 1992

[51] Int. Cl.$^5$ .................. B29C 33/20; B29C 45/64
[52] U.S. Cl. .......................... 425/186; 249/219.1; 425/192 R; 425/193; 425/443; 425/451; 425/451.9; 425/595; 425/DIG. 221
[58] Field of Search ............. 425/186, 192 R, 441, 425/443, 451, 595, 451.9, 190, 193, 195, 589, DIG. 221; 249/219.1, 219.2

[56] References Cited
U.S. PATENT DOCUMENTS

| | | | |
|---|---|---|---|
| 3,125,801 | 3/1964 | Fields | 249/59 |
| 3,774,874 | 11/1973 | Clark | 249/59 |
| 4,052,033 | 10/1977 | Taylor | 249/67 |
| 4,248,583 | 2/1981 | Hedke et al. | 425/451.9 |
| 4,372,738 | 2/1983 | Black et al. | 425/451.9 |
| 4,561,626 | 12/1985 | Black | 425/190 |
| 4,671,764 | 6/1987 | Hehe | 425/595 |
| 4,676,474 | 6/1987 | Vallet et al. | 249/68 |
| 4,790,739 | 12/1988 | Manfredi | 425/595 |
| 4,919,608 | 4/1990 | Catalanotti | 425/556 |

OTHER PUBLICATIONS

D-M-E Standard Jiffy Latch-Lok Assemblies Brochure –1 page.
D-M-E Standard Early Ejector Return Assembly Brochure —1 page.
Hasco-Klinkenzug Latch Loquet –1 page Jun. 1990.
Hasco-Klinkenzug Latch Loquet –1 page Sep. 1990.

*Primary Examiner*—Khanh Nguyen
*Attorney, Agent, or Firm*—Fishman, Dionne & Cantor

[57] ABSTRACT

A stripper plate locking device for use with the mold in a molding machine (e.g., injection, compression or transfer) is presented. The mold has openings in each of the plates of the mold for accepting the stripper plate locking device. The device includes a release pin, a body member and a collet member. The pin has a shaft with a head disposed at one end and a first pair of camming surfaces with a shaft portion therebetween disposed at the other end. The body members has a second pair of camming surfaces with a cylindrical portion therebetween disposed at one end thereof and an opening therethrough wherein the shaft of the pin passes. The collet member has a plurality of expandable resilient fingers which define an opening. The collet member includes a third pair of camming surfaces with a first cylindrical section therebetween for expanding the fingers in cooperation with the first camming surface and the shaft portion of the pin. The collet member also has a fourth pair of camming surfaces with a second cylindrical section therebetween. The cylindrical portion is retained at the second cylindrical section when the fingers are in a nonexpanded position and is released when the fingers are expanded.

25 Claims, 3 Drawing Sheets

STRIPPER PLATE LOCKING DEVICE

BACKGROUND OF THE INVENTION

The present invention relates to the art of molding. More specifically, the present invention relates to a stripper plate locking device for use with multiplate multiopening mold assemblies.

Stripper plate locking devices for use with two plate single opening mold assemblies are known. Two such devices are disclosed in U.S. Pat. No. 4,052,033 to Taylor and U.S. Pat. No. 4,372,738 to Black et al.

U.S. Pat. No. 4,052,033 discloses a resiliently loaded ejector pin return and detent means which comprises resiliently expandable means which operate to provide for the early return of ejector pins into a die cavity in flush relationship with an inner surface thereof to prevent a laterally movable slide mechanism from hitting the extended ejector pins.

The ejector pin return and detent means comprises a single generally tubular member having a plurality of resilient fingers surrounding a bore extending through the tubular member, the fingers being adapted to be spread apart by a return rod and the outer portions of the fingers being expandable by the return rod when forced therebetween such as to be of a greater external dimension than the bore of a sleeve fixed to one of the die cavity members and whereby, when the aforementioned fingers are in the bore of the sleeve, the internal space between the fingers is less than the cross-section of the return rod, such that the return rod applies force to the ends of the fingers and thus, forces them out of the bore of the sleeve at the beginning of the closing of one die relative to the other and thus, movement of the fingers out of the last mentioned bore by reason of the return rod causes an ejector pin carrying member to move in a direction to retract the ejector pins into their respective die cavity into flush relationship with an inner surface thereof and out of the way of laterally movable slide mechanism so as to prevent the slide mechanism from hitting the extended ejector pins. The specific structure of the ejector pin return and detent means comprises a generally circular array of resilient fingers which are formed generally of a circular cross section structure, and wherein slots separate the fingers such that they may be resiliently deflected outward relative to each other and relative to a bore extending through the tubular member with which the fingers are integral, the fingers being closer together at one end of the tubular member than the cross section of the complimental return rod and the bore of the tubular member near the opposite end thereof being large enough to allow the return rod to pass therethrough when it has forced the fingers apart by passing therebetween. The fingers are provided with generally frusto-conical cam surfaces diverging outwardly from the respective end of the bore and the return rod is provided with a generally conical or frusto-conical surface adapted to cooperate with the aforementioned cam surfaces on the ends of the fingers so as to force the fingers apart after the fingers have passed out of the bore at one end of the aforementioned sleeve.

U.S. Pat. No. 4,372,738 discloses a mechanism for locking together two mold parts movable between an open position spaced from each other and a closed position sealingly contacting each other, including an elongate tie rod which extends between the mold parts, is mounted on one of the mold parts, and has locking means thereon at a location spaced from the first mold part. A locking device provided on the other mold part can selectively engage the locking means on the tie rod for preventing lengthwise movement of the tie rod relative to the other mold part and includes a plurality of locking members which are disposed at angularly spaced locations about the axis of the tie rod and are supported for movement toward and away from the tie rod axis between retracted and locking positions. When the mold parts are in the closed position, the tie rod is received between the locking members and each locking member, when in the locking position, engages the locking means on the tie rod. An actuating mechanism is provided for effecting movement of he locking members between their retracted and locking positions, and a selectively actuable disable mechanism is provided for resisting movement of the locking members away from the locking position.

The locking device includes a collet sleeve which surrounds the tie rod axis and is fixed against movement relative to the second mold part in a direction parallel to the tie rod axis. The sleeve has a plurality of peripherally spaced slots therein which extend substantially axially from a first end thereof and define a plurality of axially extending arms which are resiliently flexible in directions substantially perpendicular to the tie rod axis, each of the locking members being provided at the free end of a respective one of the arms and on the side thereof facing the tie rod axis. When the mold parts are in the closed position, the tie rod is received within the collet sleeve. The collet sleeve has an outwardly facing surface at the first end thereof, and the disable mechanism includes a collar which surrounds the tie rod axis, is supported on the second mold part for movement parallel to the tie rod axis between first and second positions, and has an inwardly facing surface thereon which is engageable with the outwardly facing surface on the collet sleeve when the locking members are in the locking position and the collar is in the second position in order to prevent movement of the locking members away from the locking position.

The actuating mechanism includes an annular piston chamber which encircles the collet sleeve, an annular piston supported for reciprocal movement in the chamber and operatively coupled to the collar, and a mechanism for selectively supplying pressurized fluid to the piston chamber on opposite sides of the piston to effect reciprocal movement of the piston, which reciprocal movement in turn effects reciprocal movement of the collar between its first and second positions.

The above described prior art is not suitable for use with multiplate multiopening mold assemblies. Stripper plate locking devices for such are also known. Such devices are commercially available, for example, from Hasco ® a German company under part numbers Z171/ and Z170/. The Z171/ part number comprises a housing and a base which are mounted onto the mold plate to be drawn. A latch bar is secured to the moving plate while a control bar is secured to the stationary plate. Accordingly, when the machine opens the mold, the mold plate opens from the stationary plate until a slanted portion of the control bar disengages a sliding lock. The moving plate can now be opened from the mold plate. The stroke of the mold plate is limited in this position. The length of the slanted portion corresponds to the minimum movement of the latch locking unit. The Z/170 part number comprises a latch housing and a base plate mounted onto the mold plate to be drawn. A latch bar is secured to the moving plate and a lock and release bar is secured to the stationary plate. A locking roller is pressed by the lock and release bar into a recess in the latch bar and makes a positive connection with the mold plate to be drawn. Accordingly, when the machine opens the mold the mold plate opens from the stationary plate. The inclination of the lock then releases the locking roller and the latch bar moves further opening the mold plate from the stationary plate. The mold plate is mechanically held in this position by the sliding lock.

Other latch locking devices are also available (e.g., D-M-E Jiffy Latch-Lok). While, these devices are designed for multiplate multiopening molds, they require an excessive amount of set up time. Accordingly, a need exists for an improved stripper plate locking device for use with multiplate multiopening mold assemblies.

SUMMARY OF THE INVENTION

The above-discussed and other problems and deficiencies of the prior art are overcome or alleviated by the stripper plate locking device of the present invention. In accordance with the present invention, a mold (e.g., injection, compression or transfer) has openings in each of the plates of the mold for accepting the stripper plate locking device. The device comprises a release pin, a body member and a collet member. The pin has a shaft with boss means disposed at one end and releasing means disposed at the other end. The body member has first coupling means disposed at one end thereof and an opening therethrough wherein the shaft of the pin passes. The collet member has a plurality of expandable resilient fingers which define an opening. The collet member also includes means for expanding the fingers and a second coupling means. The releasing means cooperate with the expanding means to expand the fingers for engaging and releasing the first and second coupling means from each other.

The boss means of the pin is slidably retained in an opening of a first mold plate by a second mold plate attached thereto. The shaft of the pin extends through an opening in the second plate and through the opening in the body member. The body member is retained in a third mold plate. The collet member is retained in a fourth mold plate.

Preferably the first mold plate is attached to the fixed platen of a molding machine and the fourth mold plate is attached to the moving platen of the molding machine. During stripping of the mold the fourth mold plate is moved downwardly by the moving platen. This causes the boss means of the pin to travel the length of the opening in the first mold plate. The first and second coupling means hold the third and fourth plates together. Therefore, a first mold opening is defined between the second and third mold plates by the above downward motion. The continued downward motion causes the release means to engage the expanding means and expand the fingers to a point at which the first and second coupling means are released. This allows the third and fourth plates to separate defining a second mold opening.

The closing of the mold and the engagement of the first and second coupling means is accomplished is a manner similar to the opening of the mold, however in an opposite direction (i.e., upward movement of the moving platen).

The aforementioned prior art devices of U.S. Pat. Nos. 4,052,033 and 4,372,738 do not provide for more than a single mold opening, as does the present invention. Further, the prior art devices for multiplate multiopening molds fail to disclose any of the features of the present invention. The present invention greatly reduces the set up time of a mold assembly as compared to that of the prior art devices for more than one mold opening described hereinbefore.

The above-discussed and other features and advantages of the present invention will be appreciated and understood by those skilled in the art from the following detailed description and drawings.

BRIEF DESCRIPTION OF THE DRAWINGS

Referring now to the drawings wherein the like elements are numbered alike in the several FIGURES.

DESCRIPTION OF THE PREFERRED EMBODIMENT

Figure 1:
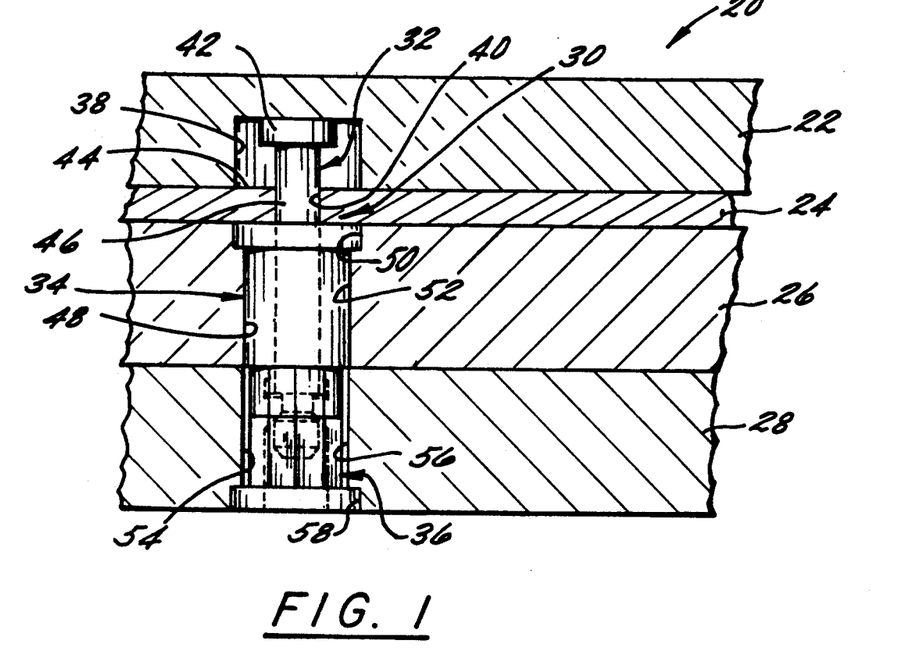
FIG. 1 is a partly cross-sectional side elevational view of a plurality of mold plates with the stripper plate locking device of the present invention installed therein and with the mold plates in the closed position.

Referring to FIGS. 1-4 a section of a mold (e.g., injection, compression or transfer) is shown generally at 20. FIG. 1 shows mold 20 in a closed position (i.e., prior to stripping). Mold 20 comprises a first mold plate 22 (commonly referred to as the top clamp plate), a second mold plate 24 attached to mold plate 22 by any known means (e.g., bolts), a third mold plate 26 (commonly referred to as the stripper plate) and a fourth mold plate 28. Mold openings are between plates 24 and 26, and between plates 26 and 28. As is known an ejection housing (not shown) is mounted below mold 20 for ejecting the molded plastic.

Plates 22 and 24 are attached by known means (e.g. bolts) to the fixed platen of a molding machine (not shown) as is known. Plate 28 is attached by known means to the moving platen of the molding machine as is known. A stripper plate locking device, in accordance with the present invention, is shown disposed in mold 20 generally at 30. While only one stripper plate locking device is shown and described herein, it is preferred that two stripper plate locking devices be employed with each set of mold plates. Device 30 comprises a release pin 32, a body member 34 and collet member 36. Each plate has an opening described below to accommodate device 30. Plate 22 has a cylindrical opening 38 which is closed at its upper end and open at its lower end. Plate 24 closes off the open end of opening 38 except for a cylindrical opening 40 extend through plate 24. Opening 40 is located at about the center of opening 38. Pin 32 includes boss means 42 disposed in opening 38 and retained therein by an upper surface 44 of plate 24. It will be appreciated that the stripper plate could be attached to the moving platen in which case the stripper plate locking devices would be reversed. Alternatively, two stripper plates on a mold could be employed. Boss means 42 is preferably comprised of a head. A shaft 46 extends downwardly from boss means 42 and passes through opening 40. Plate 26 has a cylindrical opening 48 with an upper portion 50 having a larger diameter than a lower portion 52. Body member 34 is disposed in opening 48. Plate 28 has a cylindrical opening 54 with an upper portion 56 having a smaller diameter than a lower portion 58. Collet member 36 is disposed in opening 54. It will be appreciated that collet member 36 is supported by a support plate (not shown). The support plate is associated with the ejector means described hereinbefore, as is known.

Figure 5:
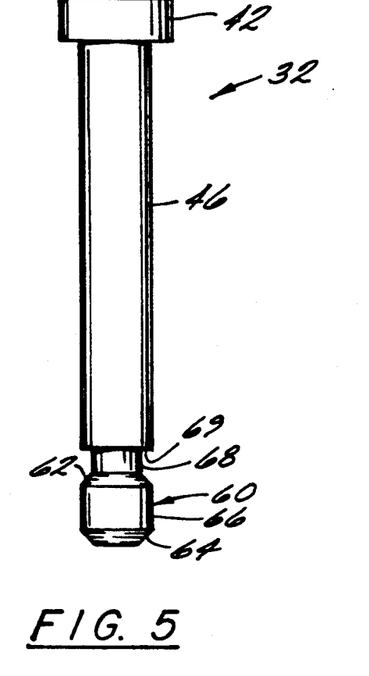
FIG. 5 is a side elevational view of the pin of the stripper plate locking device of FIG. 1.

Referring to FIG. 5, release pin 32 includes boss means 42 disposed at one end of shaft 46 and releasing means 60 disposed at the other end of shaft 46. Releasing means 60 comprises a pair of camming surfaces 62 and 64 with a shaft portion 66 therebetween. Releasing means 60 is spaced from shaft 46 by a shaft portion 68 (i.e., an extension member), wherein the diameter of shaft portion 68 is smaller than that of shaft 46 whereby a retaining edge 69 is defined. Also, shaft portion 66 preferably has the same diameter as that of shaft 46.

Figure 6:
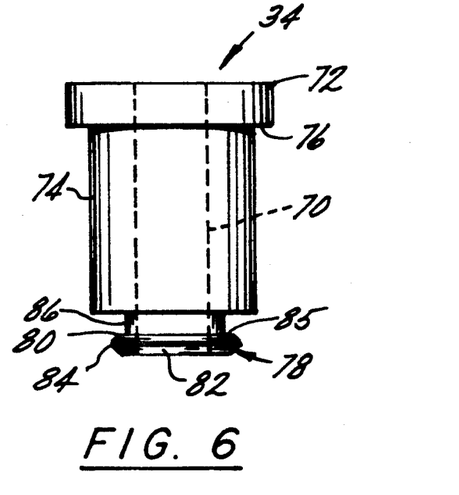
FIG. 6 is a side elevational view of the body member of the stripper plate locking device of FIG. 1.

Referring to FIG. 6, body member 34 has a cylindrical opening 70 extending longitudinally therethrough being receptive to shaft 46 of pin 32. Member 34 is generally cylindrical with upper and lower cylindrical portions 72 and 74, wherein the diameter of portion 72 is greater than that of portion 74 and whereby a peripheral retaining edge 76 is defined to provide means for retaining body member 34 in opening 48 of plate 26. Further, first coupling means 78 is disposed at the lower end of portion 74. First coupling means 78 comprises a pair of camming surfaces 80 and 82 with a cylindrical portion 84 therebetween. Camming surface 80 extends from a retaining edge 85. First coupling means 78 is spaced from portion 74 by a cylindrical portion 86 (i.e., an extension member), wherein the diameter of portion 86 is less than that of portion 84 which is less than that of portion 74.

Figure 7:
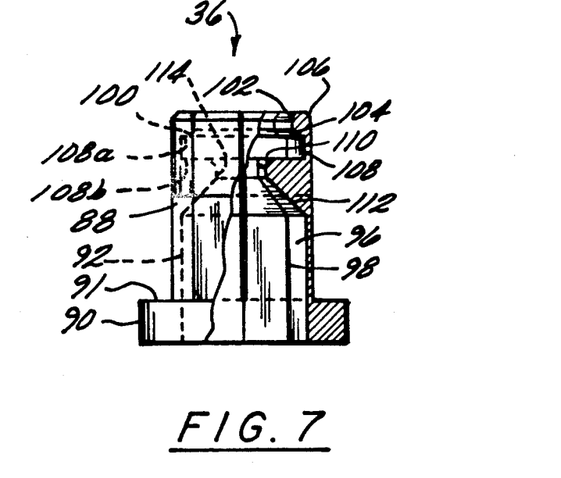
FIG. 7 is a partly cross-sectional side elevational view of the collet member of the stripper plate locking device of FIG. 1.
Figure 8:
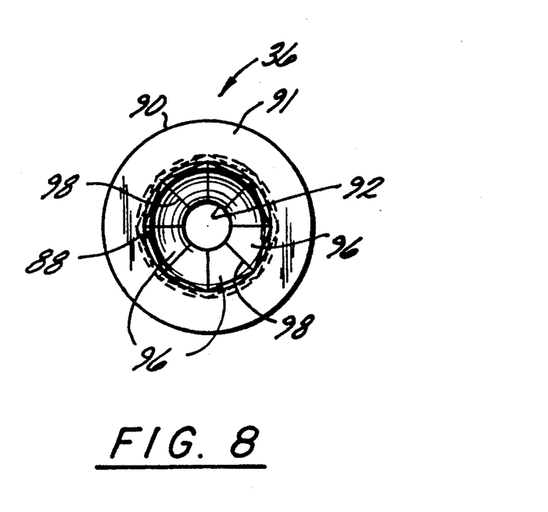
FIG. 8 is a top view of the collet member of FIG. 7.

Referring to FIGS. 7 and 8, collet member 36 is generally cylindrical with upper and lower cylindrical portions 88 and 90, wherein the diameter of portion 88 is smaller than that of portion 90, whereby a peripheral retaining edge 91 is defined to provide means for retaining collet member 36 in opening 54 of plate 28. An opening 92 extends longitudinally through collet member 36. Portion 88 comprises a plurality of resilient fingers 96 which are defined by a plurality of longitudinal slots 98. Also, each slot 98 terminates at surface 91. Further, a portion of material is removed from below the expanding means (described hereinafter) on the interior and exterior surfaces of portion 88, resulting in flat interior and exterior surfaces, as is clearly shown in FIG. 7.

Second coupling means 100 is defined by a portion of the interior surface of collet member 36. Second coupling means 100 comprises a first pair of camming (i.e., angled or beveled) surfaces 102 and 104 separated by a cylindrical section 106 followed by a cylindrical section 108, the diameter of which is larger than that of section 106. Section 108 defines a retaining edge 108a and an opposing edge 108b. Means for expanding fingers 96 are also defined by a portion of the interior surface of collet member 36. The expanding means comprises a pair of camming surface 110 and 112 separated by a cylindrical section 114, the diameter of which is smaller than that of section 106 and 108. Also, camming surface 112 is substantially longer than surface 110. The remainder of interior surface 100 comprise a octagonal section 116.

Returning to FIG. 1, the stripper plate locking device 30 is locked in its closed position. Release pin 32 is secured to collet member 36 whereby releasing means 60 is disposed in opening 92 at section 116. Surface 62 of pin 32 is adjacent to surface 112 of member 36. Shaft portion 68 of pin 36 is retained by section 114 of member 36, whereby the diameter of section 114 closely corresponds to the diameter of portion 68. The length of portion 68 closely corresponds to the length defined by section 114 and surface 110. Pin 32 is prohibited from further downward movement by edge 108b of member 36 which faces edge 69 of pin 32.

Body member 34 is secured to collet member 36, whereby the first coupling means 78 is engaged with the second coupling means 100. More specifically, the first coupling means 78 is disposed in opening 92 at section 108. First coupling means 78 is retained by edge 108b of member 36 which faces edge 85 of member 34. The length of portion 86 closely corresponds to the length defined by section 106 and edge 102.

Figure 2:
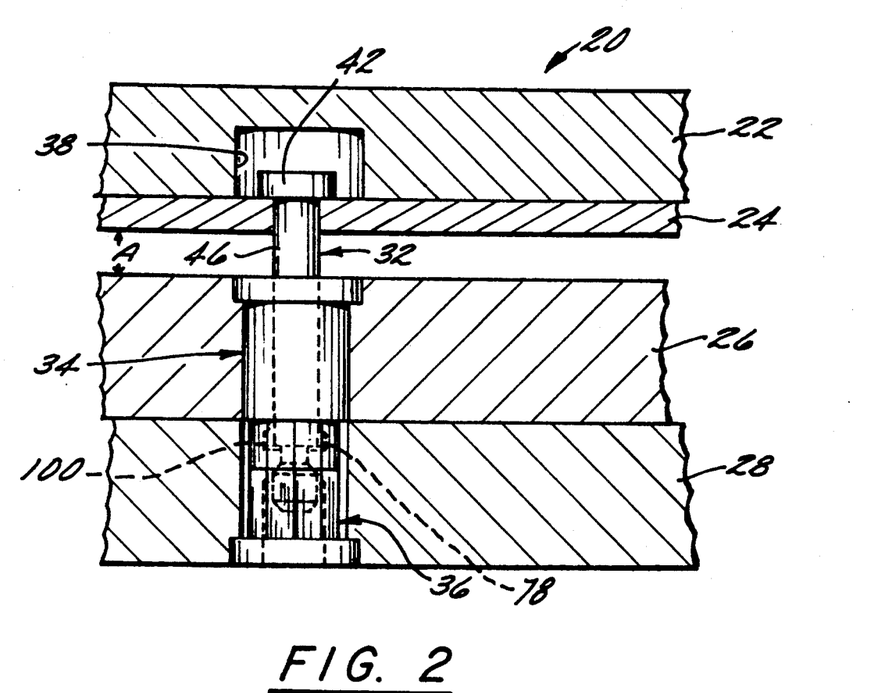
FIG. 2 is a partly cross-sectional side elevational view of a plurality of mold plates with the stripper plate locking device of FIG. 1 with the mold plates open to a first mold opening.

Referring now to FIG. 2 wherein the first step of the stripping process is shown. The moving platen of the molding machine described hereinbefore moves downwardly, whereby plates 26 and 28 move downwardly until boss means 42 of pin 32 contacts plate 24. It will be appreciated that plates 26 and 28 remain coupled together due to the engagement of the first and second coupling means 78 and 100, described hereinbefore. Plates 22 and 24 are connected to the fixed platen of the molding machine and therefore are also fixed. The amount of travel of boss means 42 in opening 38 determines the amount of the first mold opening designated A. Accordingly, the length A directly corresponds to the length of opening 38.

Figure 3:
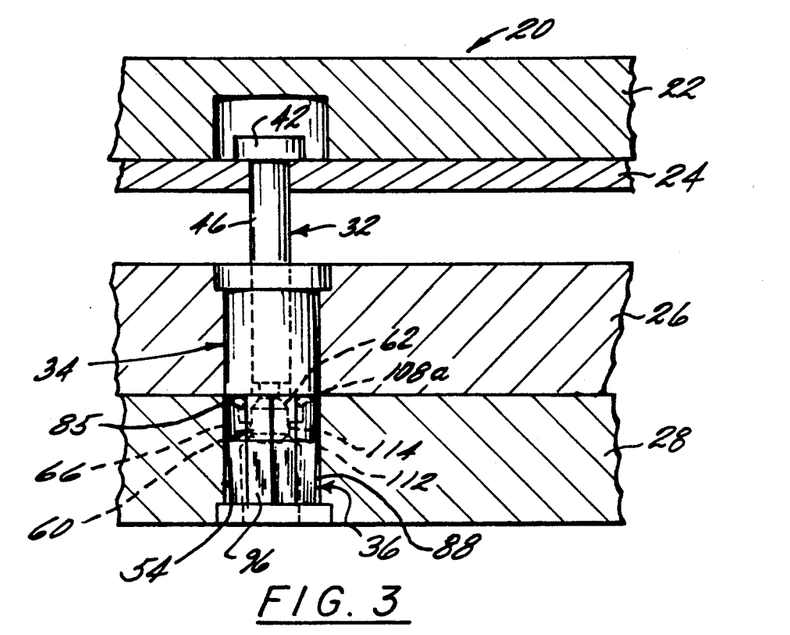
FIG. 3 is a partly cross-sectional side elevational view of a plurality of mold plates with the stripper plate locking device of FIG. 1 with the first and second coupling means of the stripper plate locking device being released.

Referring to FIG. 3 wherein continued downward movement of the moving platen and thereby plates 26 and 28 cases release means 60 of pin 32 in cooperation with the expanding means of collet member 36 to spread fingers 96 of collet member 36 apart. This is accomplished by the camming surface 62 of means 60 moving up the opposing surface 112 of the expanding means. Then as shaft portion 66 enters section 114 the fingers 96 are separated by a sufficient amount to move edge 108a out of the path of edge 85 of the body member 34. This is the position shown in FIG. 3. It will be appreciated that the diameter of opening 54 is greater than the diameter of portion 88 of collet member 36 to allow sufficient movement of fingers 96.

Figure 4:
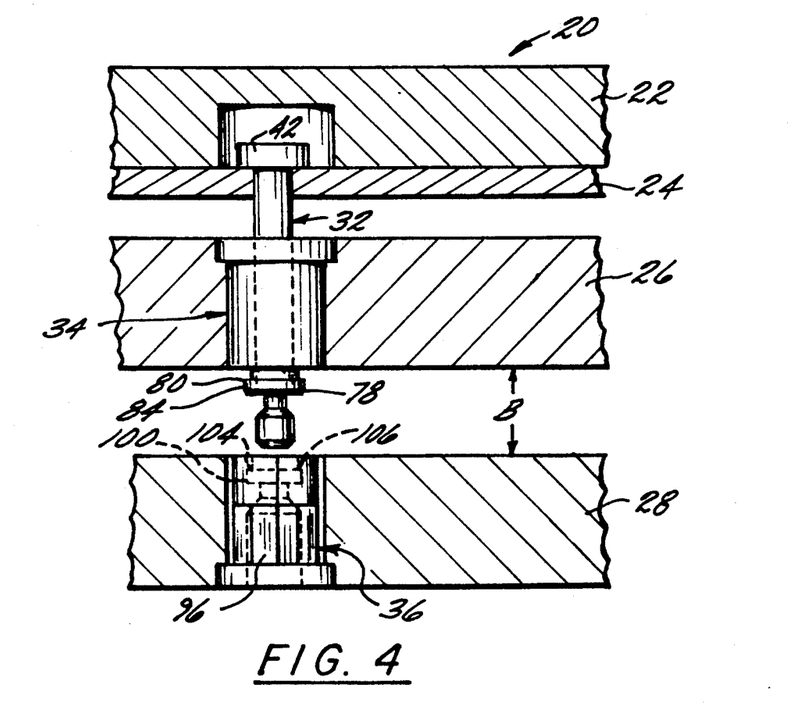
FIG. 4 is a partly cross-sectional side elevational view of a plurality of mold plates with the stripper plate locking device of FIG. 1 with the mold plates open to a second mold opening.

Referring to FIG. 4, wherein continued downward movement of the moving platen and thereby plate 28 allows the first coupling means 78 of the body member 34 to be released from the second coupling means 100 of the collet member 36. This release is aided by opposing cam surfaces 104 and 80 of members 36 and 34 respectively which will force fingers 96 further apart to allow portion 84 on member 34 to pass through section 106 of member 36.

Once the body member 34 is released from the collet member 36 the continuing downward movement of plate 28 (via the moving platen) will provide the second mold opening designated B.

The mold 20 is shown in FIG. 4 in an open position (i.e., after stripping). Although not shown in the FIGURES the device 30 closes in a manner similar to the opening process described hereinbefore. The moving platen along with plate 28 moves upwardly bringing the camming surface 64 of pin 32 into contact with opposing camming surface 110 of the collet member 36 and bringing camming surface 82 of the body member 34 into contact with opposing camming surface 102 of the collet member 36. Then boss member 42 of pin 32 will move up to the closed end of opening 38. At the same time the mold opening A and B are closing. With continued upward movement of the moving platen surface 64 of pin 32 will push against surface 110 of member 36 opening fingers 96. Fingers 96 continue to open until portion 66 of pin 32 is within section 114 of member 36. At this point surface 82 of member 34 will push against surface 102 of member 36 until portion 84 of member 34 enters section 106 of member 36. Continued upward movement will then force first coupling means 78 of member 34 into section 108 of member 36 and will force releasing means 60 of pin 32 into section 116 of member 36 as is shown in FIG. 1.

Pin 32 is preferably comprised of AISI TYPE D2 (air hardening tool steel) comprising; carbon 1.50%, manganese 0.50%, silicon 0.30% chromium 12.00%, molybdeneum 0.80%, and vanadium 0.90%. Body member 34 is preferably comprised of AISI TYPE S-7 (air hardening tool steel) comprising; carbon 0.50%, manganese 0.70%, silicon 0.30%, chromium 3.25%, and molybdenum 1.40%. Collet member 36 is preferably comprised of AISI TYPE W-1 (water hardening tool steel) comprising; carbon 1.05%, manganese 0.20%, and silicon 0.20%.

The above combination of materials has been found to provide good wearability in excess of one million cycles. It will be appreciated that corresponding dimensions are critical and assure proper timing of mold openings. It will be appreciated that dimensions were also a critical feature of the prior art devices.

Accordingly, a timed multiplate multiopening mold stripping device is presented. The present invention provides a substantial reduction in setup time as compared to the aforementioned prior art.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A stripper plate locking device for use with a molding machine having a fixed platen and a moving platen, the device comprising:
   a first mold plate having an opening therein;
   a second mold plate attached to said first plate, said second plate having an opening therethrough, said second plate closing off said opening in said first plate except at said opening in said second plate, at least one of said first and second plates being secured to one of the platens of the molding machine;
   a third mold plate having an opening;
   a fourth mold plate having an opening therethrough, said third mold plate disposed between said fourth and second mold plates, said fourth mold plate secured to the other one of the platens of the molding machine;
   a pin having a shaft with a boss disposed at one end thereof and releasing means disposed at the other end thereof, said boss being slidably retained in said opening in said first mold plate by said second mold plate, said shaft extending through said opening in said second mold plate;
   a body having first coupling means disposed at one end thereof, said body having an opening extending therethrough, said shaft of said pin extending through said opening in said body, said body having means for retaining said body in said opening of said third mold plate; and
   a collet having a plurality of expandable resilient fingers defining an opening, said collet having expanding means disposed at the interior of said opening defined by said fingers, said fingers being expanded by said releasing means cooperating with said expanding means of said collet, said fingers having second coupling means for engaging said first coupling means of said body, wherein said first and second coupling means are released by expanding said fingers, said collet having means for retaining said collet in said opening of said fourth plate.

2. The device of claim 1 wherein said boss comprises: a head disposed at one end of said shaft.

3. The device of claim 1 wherein said releasing means comprises:
   a shaft portion having a diameter sufficient for cooperating with said expanding means to expand said fingers to an amount sufficient for releasing said first and second coupling means; and
   first and second camming surfaces having said shaft portion therebetween, said first camming surface disposed at one end of said shaft, said first camming surface to facilitate release of said first and second coupling means during the opening of the molding machine, said second camming surface to facilitate release of said first and second coupling means during the closing of the molding machine.

4. The device of claim 3 wherein said expanding means comprises:
   an inwardly extending surface disposed on each of said fingers at the interior of said opening defined by said fingers, said inwardly extending surfaces defining a diameter sufficient for cooperating with said shaft portion to expand said fingers to the amount sufficient for releasing said first and second coupling means; and
   third and fourth camming surfaces disposed on each of said fingers, said third and fourth camming surfaces having said inwardly extending surfaces therebetween, said third camming surfaces cooperating with said first camming surface to facilitate the release of said first and second coupling means during the opening of the molding machine, said fourth camming surfaces cooperating with said second camming surface to facilitate the release of said first and second coupling means during the closing of the molding machine.

5. The device of claim 1 wherein said first coupling means comprises:
   a cylindrical portion having said opening of said body therethrough, said cylindrical portion having a diameter sufficient for being received by said second coupling means when said fingers are expanded and for being retained by said second coupling means when said fingers are in a nonexpanded position; and first and second camming surfaces having said cylindrical portion therebetween, said first camming surface disposed at one end of said body, said first camming surface to assist in releasing said cylindrical portion from said second coupling means during the opening of the molding machine, said second camming surface to assist in releasing said cylindrical portion from said second coupling means during the closing of the molding machine.

6. The device of claim 5 wherein second coupling means comprises:

an inwardly extending surface disposed on each of said fingers at the interior of said opening defined by said fingers, said inwardly extending surfaces defining a diameter sufficient for allowing said cylindrical portion to pass through said inwardly extending surfaces when said fingers are expanded and for retaining said cylindrical portion when said fingers are in the nonexpanded position; and third and fourth camming surfaces disposed on each of said fingers, said third and fourth camming surfaces having said inwardly extending surfaces therebetween, said third camming surfaces cooperating with said first camming surface to assist in allowing said cylindrical portion to pass through said inwardly extending surfaces during the opening of the molding machine, said fourth camming surfaces cooperating with said second camming surface to assist in allowing said cylindrical portion to pass through said inwardly extending surfaces during the closing of the molding machine.

7. The device of claim 1 wherein said opening in said third mold plate includes an offset portion defining a ledge; and wherein said body includes an outwardly extending portion defining an edge, said edge of said body being supported by said ledge of said third mold plate.

8. The device of claim 1 wherein said opening in said fourth mold plate includes an offset portion defining a ledge; and wherein said collet includes an outwardly extending portion defining an edge, said edge of said collet being supported by said ledge of said fourth mold plate.

9. The device of claim 5 further comprising:
an extension member disposed between said first camming surface and said one end of said body.

10. The device of claim 3 further comprising:
an extension member disposed between said first camming surface and said one end of said shaft.

11. The device of claim 1 wherein said opening in said first mold plate defines a first mold opening between said second and third plates.

12. The device of claim 1 wherein said pin comprises AISI TYPE D2 air hardening tool steel;
wherein said body comprises AISI TYPE S-7 air hardening tool steel; and
wherein said collet comprises AISI TYPE W-1 water hardening tool steel.

13. A stripper plate locking device for use with a molding machine having a fixed platen and a moving platen, the device comprising:

a first mold plate having an opening therein;

a second mold plate attached to said first plate, said second plate having an opening therethrough, said second plate closing off said opening in said first plate except at said opening in said second plate, at least one of said first and second plates being secured to one of the platens of the molding machine;

a third mold plate having an opening;

a fourth mold plate having an opening therethrough, said third mold plate disposed between said fourth and second mold plates, said fourth mold plate secured to the other one of the platens of the molding machine;

a pin having a shaft with a boss disposed at one end thereof and releasing means disposed at the other end thereof, said boss being slidably retained in said opening in said first mold plate by said second mold plate, said shaft extending through said opening in said second mold plate;

wherein said release means comprises, (1) a shaft portion having a diameter sufficient for cooperating with said expanding means to expand said fingers to an amount sufficient for releasing said first and second coupling means, and (2) first and second camming surfaces having said shaft portion therebetween, said first camming surface disposed at one end of said shaft, said first camming surface to facilitate release of said first and second coupling means during the opening of the molding machine, said second camming surface to facilitate release of said first and second coupling means during the closing of the molding machine;

a body having first coupling means disposed at one end thereof, said body having an opening extending therethrough, said shaft of said pin extending through said opening in said body, said body having means for retaining said body in said opening of said third mold plate;

a collet having a plurality of expandable fingers defining an opening, said collet having expanding means disposed at the interior of said opening defined by said fingers, said fingers being expanded by said releasing means cooperating with said expanding means of said collet, said fingers having second coupling means for engaging said first coupling means of said body, wherein said first and second coupling means are released by expanding said fingers, said collet having means for retaining said collet in said opening of said fourth plate;

wherein said expanding means comprises, (1) an inwardly extending surface disposed on each of said fingers at the interior of said opening defined by said fingers, said inwardly extending surfaces defining a diameter sufficient for cooperating with said shaft portion to expand said fingers to the amount sufficient for releasing said first and second coupling means, and (2) third and fourth camming surfaces disposed on each of said fingers, said third and fourth camming surfaces having said inwardly extending surfaces therebetween, said third camming surfaces cooperating with said first camming surface to facilitate the release of said first and second coupling means during the opening of the molding machine, said fourth camming surfaces cooperating with said second camming surface to facilitate the release of said first and second coupling means during the closing of the molding machine;

wherein said first coupling means comprises,
(1) a cylindrical portion having said opening of said body therethrough, said cylindrical portion having a diameter sufficient for being received by said second coupling means when said fingers are expanded and for being retained by said second coupling means when said fingers are in a nonexpanded position, and
(2) fifth and sixth camming surfaces having said cylindrical portion therebetween, said fifth camming surface disposed at one end of said body, said fifth camming surface to assist in releasing said cylindrical portion from said second coupling means during the opening of the molding machine, said sixth camming surface to assist in releasing said cylindrical portion from said second coupling means during the closing of the molding machine; and wherein said second coupling means comprises,
(1) an inwardly extending surface disposed on each of said fingers at the interior of said opening defined by said fingers, said inwardly extending surfaces defining a diameter sufficient for allowing said cylindrical portion to pass through said inwardly extending surfaces when said fingers are expanded and for retaining said cylindrical portion when said fingers are in the nonexpanded position, and
(2) seventh and eighth camming surfaces disposed on each of said fingers, said seventh and eighth camming surfaces having said inwardly extending surfaces therebetween, said seventh camming surfaces cooperating with said fifth camming surface to assist in allowing said cylindrical portion to pass through said inwardly extending surfaces during the opening of the molding machine, said eighth camming surfaces cooperating with said sixth camming surface to assist in allowing said cylindrical portion to pass through said inwardly extending surfaces during the closing of the molding machine.

14. The device of claim 13 wherein said opening in said third mold plate includes an offset portion defining a ledge; and
wherein said body includes an outwardly extending portion defining an edge, said edge of said body being supported by said ledge of said third mold plate.

15. The device of claim 13 wherein said opening in said fourth mold plate includes an offset portion defining a ledge; and
wherein said collet includes an outwardly extending portion defining an edge, said edge of said collet being supported by said ledge of said fourth mold plate.

16. The device of claim 13 further comprising:
an extension member disposed between said fifth camming surface and said one end of said body.

17. The device of claim 13 further comprising:
an extension member disposed between said first camming surface and said one end of said shaft.

18. The device of claim 13 wherein said pin comprises AISI TYPE D2 air hardening tool steel;
wherein said body comprises AISI TYPE S-7 air hardening tool steel; and
wherein said collet comprises AISI TYPE W-1 water hardening tool steel.

19. A stripper plate locking device for use with a molding machine comprising:

a pin having a shaft with a boss disposed at one end thereof and releasing means disposed at the other end thereof;
a body having first coupling means disposed at one end thereof, said body having an opening extending therethrough, said shaft of said pin extending through said opening in said body; and
a collet having a plurality of expandable fingers defining an opening, said collet having expanding means- disposed at the interior of said opening defined by said fingers, said fingers being expanded by said releasing means cooperating with said expanding means of said collet, said fingers having second coupling means for engaging said first coupling means of said body, wherein said first and second coupling means are released by expanding said fingers.

20. The device of claim 19 wherein said boss comprises:
a head disposed at one end of said shaft.

21. The device of claim 19 wherein said releasing means comprises:
a shaft portion having a diameter sufficient for cooperating with said expanding means to expand said fingers to an amount sufficient for releasing said first and second coupling means, and
first and second camming surfaces having said shaft portion therebetween, said first camming surface disposed at one end of said shaft; and
wherein said expanding means comprises;
an inwardly extending surface disposed on each of said fingers at the interior of said opening defined by said fingers, said inwardly extending surfaces defining a diameter sufficient for cooperating with said shaft portion to expand said fingers to the amount sufficient for releasing said first and second coupling means, and
third and fourth camming surfaces disposed on each of said fingers, said third and fourth camming surfaces having said inwardly extending surface therebetween, said third camming surfaces cooperating with said first camming surface to facilitate the release of said first and second coupling means during the opening of the molding machine, said fourth camming surfaces cooperating with said second camming surface to facilitate the release of said first and second coupling means during the closing of the molding machine.

22. The device of claim 19 wherein said first coupling means comprises:
a cylindrical portion having said opening of said body therethrough, said cylindrical portion having a diameter sufficient for being received by said second coupling means when said fingers are expanded and for being retained by said second coupling means when said fingers are in a nonexpanded position, and
first and second camming surfaces having said cylindrical portion therebetween, said first camming surface disposed at one end of said body; and
wherein said second coupling means comprises;
an inwardly extending surface disposed on each of said fingers at the interior of said opening defined by said fingers, said inwardly extending surfaces defining a diameter sufficient for allowing said cylindrical portion to pass through said inwardly extending surfaces when said fingers are expanded and for retaining said cylindrical portion when said fingers are in the nonexpanded position, and third and fourth camming surfaces disposed on each of said fingers, said third and fourth camming surfaces having said inwardly extending surfaces therebetween, said third camming surfaces cooperating with said first camming surface to assist in allowing said cylindrical portion to pass through said inwardly extending surfaces during the opening of the molding machine, said fourth camming surfaces cooperating with said second camming surface to assist in allowing said cylindrical portion to pass through said inwardly extending surfaces during the closing of the molding machine.

23. The device of claim 22 further comprising:
an extension member disposed between said first camming surface and said one end of said body.

24. The device of claim 21 further comprising:
an extension member disposed between said first camming surface and said one end of said shaft.

25. The device of claim 19 wherein said pin comprises AISI TYPE D2 air hardening tool steel;
wherein said body comprises AISI TYPE S-7 air hardening tool steel; and
wherein said collet comprises AISI TYPE W-1 water hardening tool steel.

* * * * *

UNITED STATES PATENT AND TRADEMARK OFFICE
CERTIFICATE OF CORRECTION

PATENT NO. : 5,314,323
DATED : May 24, 1994
INVENTOR(S) : Gene Bolles

It is certified that error appears in the above-identified patent and that said Letters Patent are hereby corrected as shown below:

Column 2, Line 14, After "of ", delete "he" and insert therefor --the--
Column 8, Line 8, After "boss", insert --means--
Column 10, Line 14, After "boss", insert --means--
Column 10, Line 16, after "boss", insert --means--
Column 12, Line 1 After "boss", insert --means--
Column 12, Line 19, After "boss", insert --means--
Column 12, Line 41, After "extending", delete "surface" and insert thererfor --surfaces--

Signed and Sealed this

Fifteenth Day of May, 2001

Attest:

NICHOLAS P. GODICI

Attesting Officer

Acting Director of the United States Patent and Trademark Office